(12) United States Patent
Yoshida

(10) Patent No.: US 12,339,451 B2
(45) Date of Patent: Jun. 24, 2025

(54) WEARABLE DISPLAY DEVICE

(71) Applicant: SONY GROUP CORPORATION, Tokyo (JP)

(72) Inventor: Takaaki Yoshida, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 634 days.

(21) Appl. No.: 17/603,460

(22) PCT Filed: May 14, 2020

(86) PCT No.: PCT/JP2020/019294
§ 371 (c)(1),
(2) Date: Oct. 13, 2021

(87) PCT Pub. No.: WO2020/241283
PCT Pub. Date: Dec. 3, 2020

(65) Prior Publication Data
US 2022/0197038 A1 Jun. 23, 2022

(30) Foreign Application Priority Data

May 28, 2019 (JP) ................................. 2019-099806

(51) Int. Cl.
G02B 27/01 (2006.01)
(52) U.S. Cl.
CPC .. *G02B 27/0172* (2013.01); *G02B 2027/0178* (2013.01)
(58) Field of Classification Search
CPC ................... G02B 27/0172; G02B 2027/0178
USPC ........................................................ 359/630
See application file for complete search history.

(56) References Cited

U.S. PATENT DOCUMENTS

| 10,067,359 | B1 | 9/2018 | Ushakov |
| 2016/0291327 | A1 | 10/2016 | Kim |
| 2018/0246335 | A1 | 8/2018 | Ushakov |
| 2018/0348529 | A1 | 12/2018 | Blum |

(Continued)

FOREIGN PATENT DOCUMENTS

| CN | 102636876 A | 8/2012 |
| CN | 208872947 U | 5/2019 |
| JP | 2010224472 A | * 10/2010 |

(Continued)

OTHER PUBLICATIONS

Translationof2010224472 (Year: 2024).*
Translationof2013214910 (Year: 2024).*

*Primary Examiner* — Jerry L Brooks
(74) *Attorney, Agent, or Firm* — Paratus Law Group, PLLC

(57) ABSTRACT

The present disclosure enables a user to recognize an entire display image even appropriately visually in a case where a superimposing position of a display image with respect to an image of the outside world is changed. A wearable display device according to an embodiment includes: a mounting unit (10) configured to be mounted on a head of a user; an optical unit (120) configured to emit light for forming a display image to eyeballs of the user; and a rotation mechanism (41 or 42) configured to rotatably attach the optical unit to the mounting unit, in which the rotation mechanism rotates the optical unit around a virtual axis passing through both of the eyeballs of the user.

11 Claims, 17 Drawing Sheets

(56) References Cited

U.S. PATENT DOCUMENTS

2021/0215935 A1* 7/2021 Xiao ................. G02B 27/0172

FOREIGN PATENT DOCUMENTS

| JP | 2012-168297 A | | 9/2012 |
|----|---------------|---|--------|
| JP | 2013214910 A | * | 10/2013 |
| JP | 2015-141312 A | | 8/2015 |
| JP | 2017-068045 A | | 4/2017 |
| KR | 10-1646873 B1 | | 8/2016 |

* cited by examiner

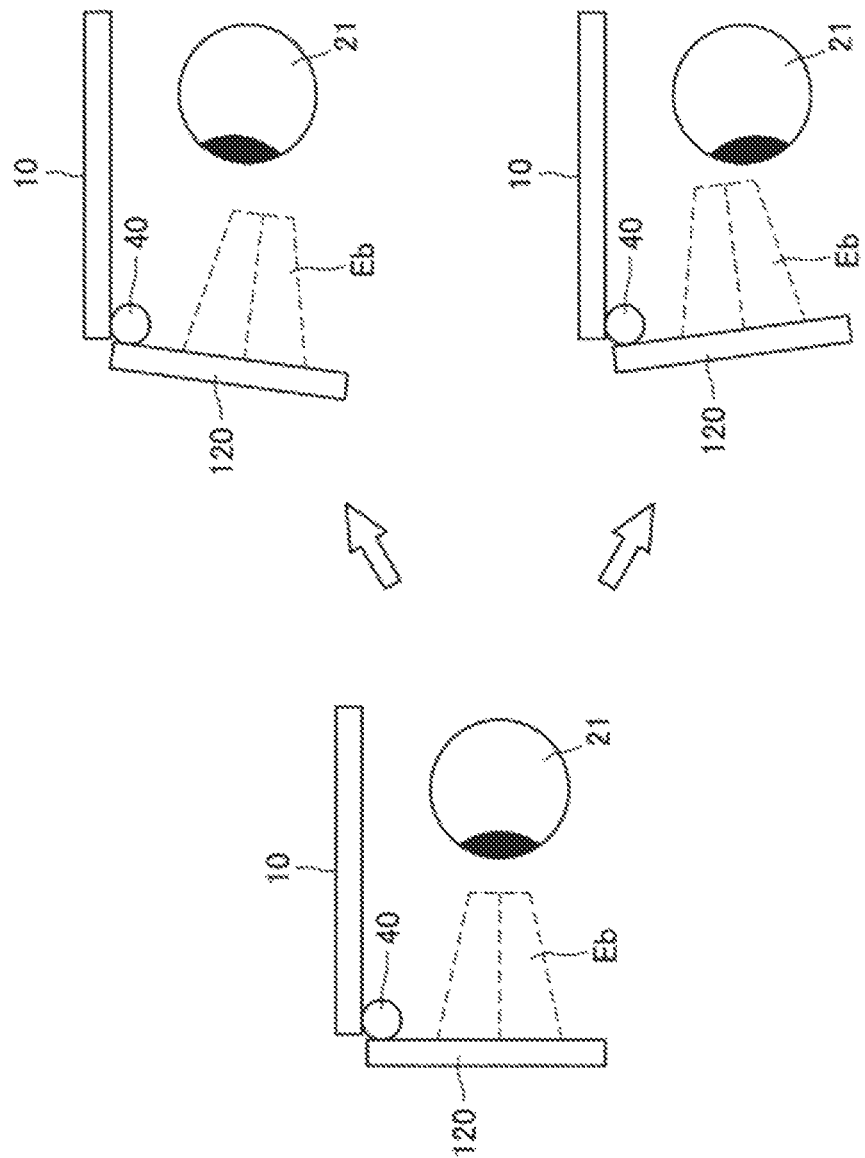

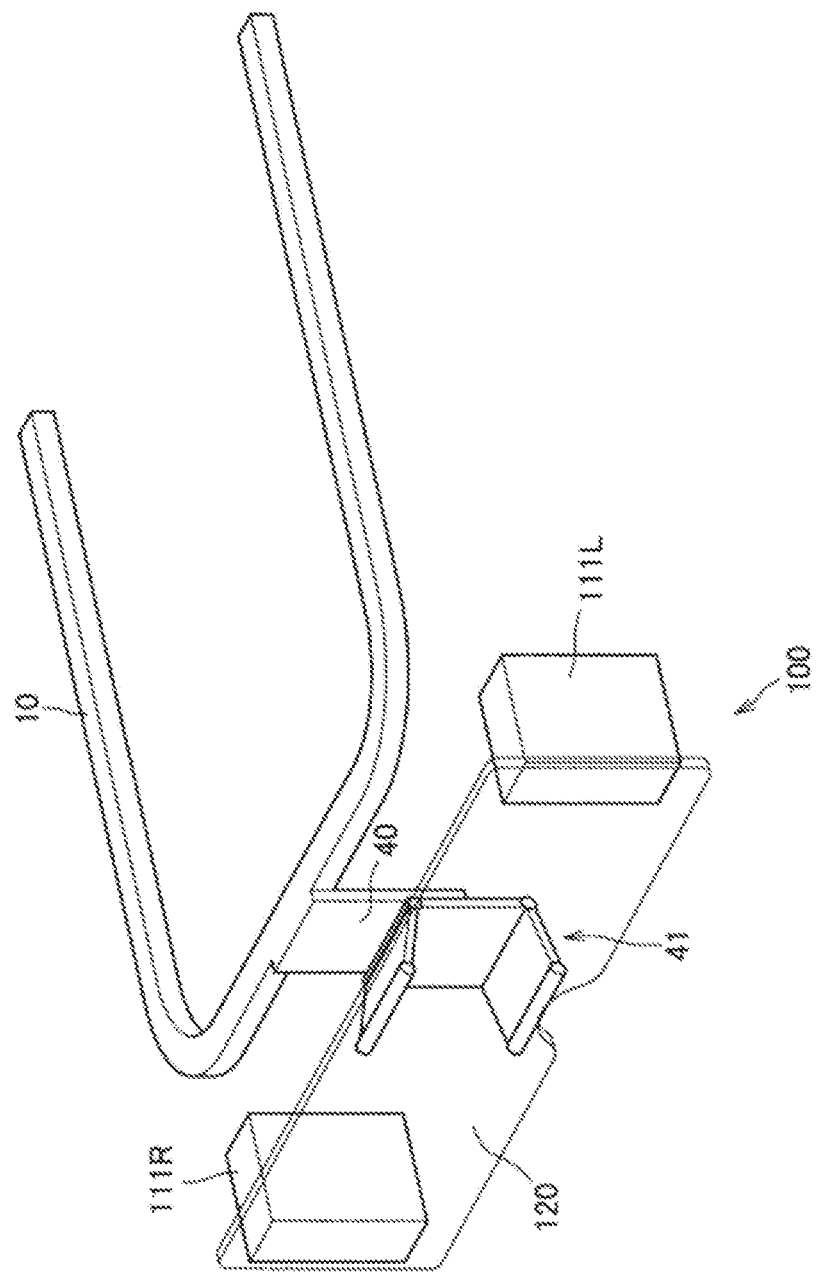

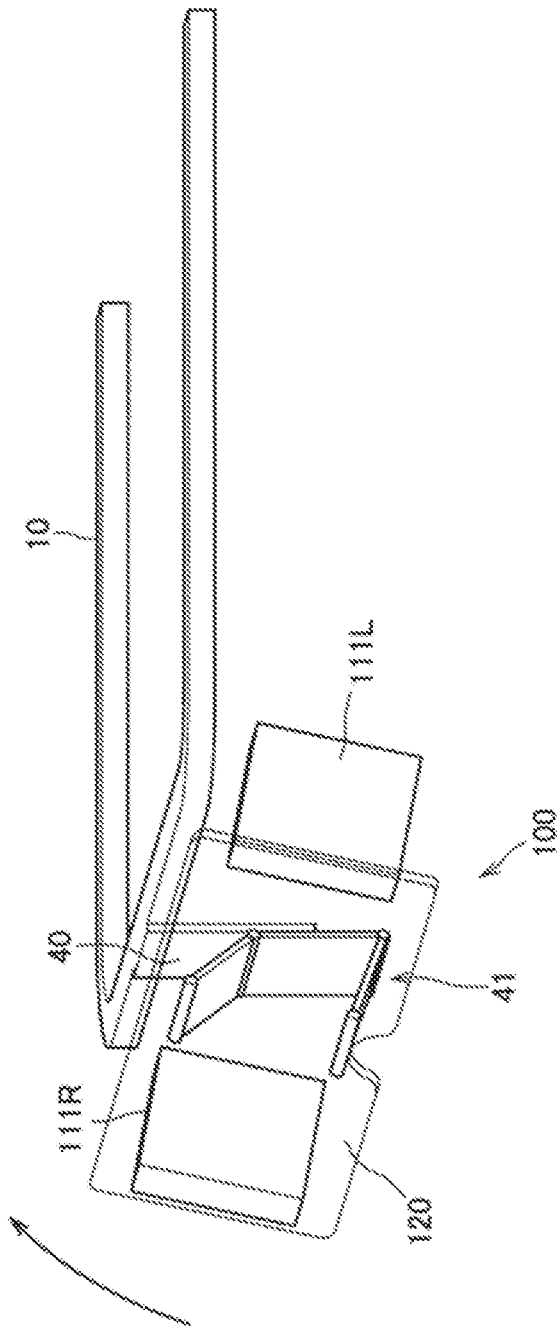

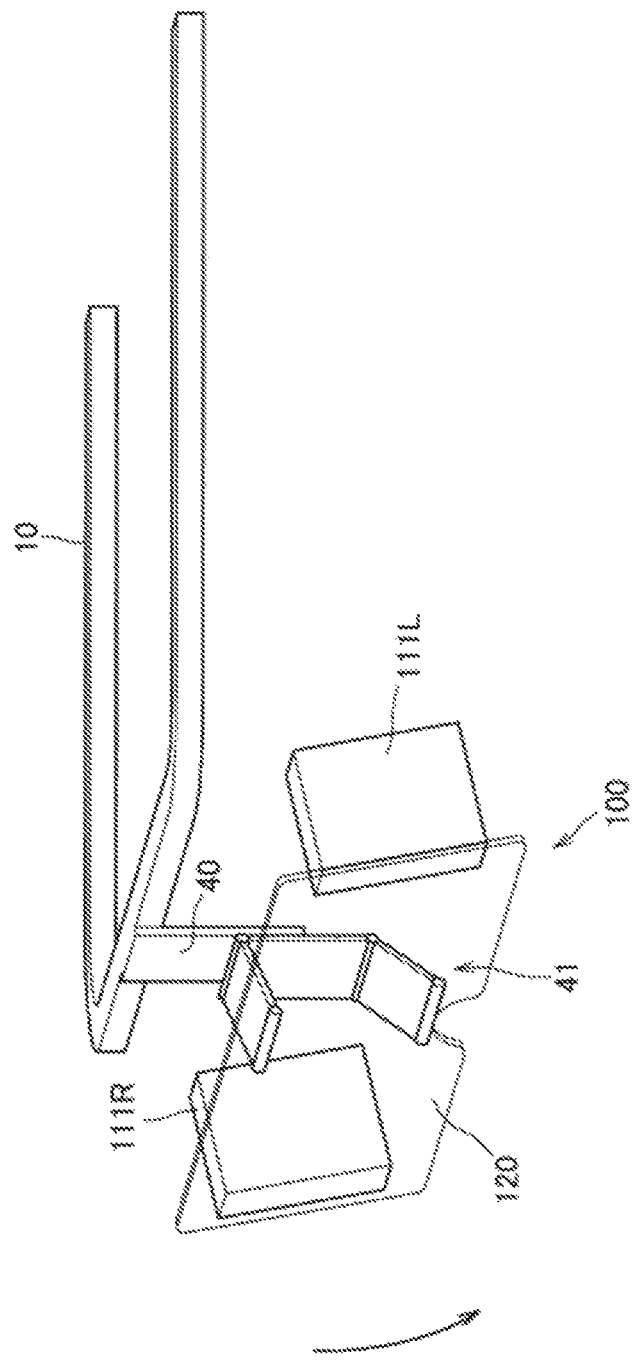

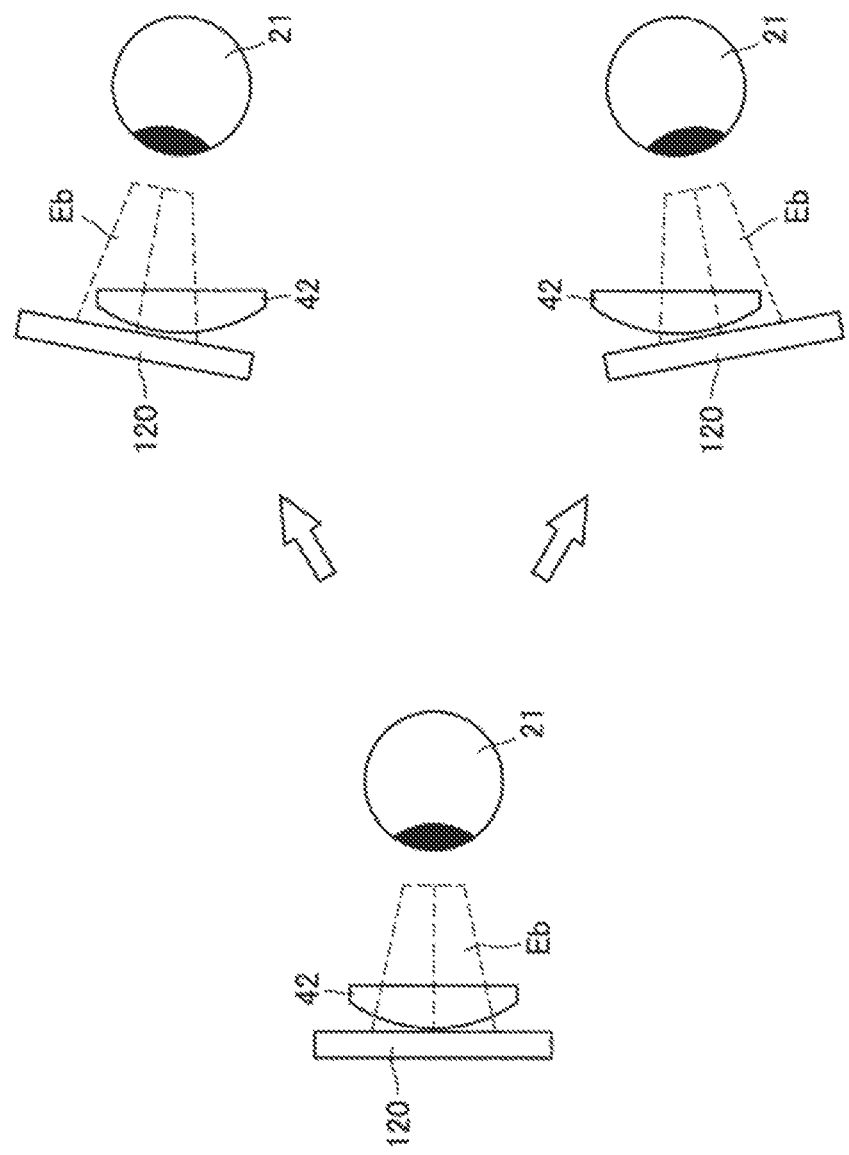

WEARABLE DISPLAY DEVICE

CROSS REFERENCE TO PRIOR APPLICATION

This application is a National Stage Patent Application of PCT International Patent Application No. PCT/JP2020/019294 (filed on May 14, 2020) under 35 U.S.C. § 371, which claims priority to Japanese Patent Application No. 2019-099806 (filed on May 28, 2019), which are all hereby incorporated by reference in their entirety.

FIELD

The present disclosure relates to a wearable display device.

BACKGROUND

In recent years, a wearable display device to be worn on a user's head or the like has been developed. The wearable display device is expected to be used in various fields because a display image can be superimposed on an image of the outside world and visually recognized by a user.

In such a wearable display device, for example, as disclosed in the following Patent Literature 1, a user can visually recognize a display image as an enlarged virtual image by using a virtual image optical system.

CITATION LIST

Patent Literature

Patent Literature 1: JP 2012-168297 A

SUMMARY

Technical Problem

In the wearable display device using the virtual image optical system, a range in which the user can visually recognize the entire virtual image of the display image is limited to a specific three-dimensional region (also referred to as an eye-box) with respect to a display surface. Therefore, in the wearable display device using the virtual image optical system, when the relative position of the eyeball of the user with respect to the display surface changes, the eyeball of the user deviates from the eye-box, and thus, the user is not able to visually recognize a part of the display image in some cases.

Meanwhile, the user wearing the wearable display device has a desire to change the superimposing position of the display image with respect to the image of the outside world in order to improve the visibility of the image of the outside world or the like. However, in a case where the superimposing position of the display image with respect to the image of the outside world is changed, the relative position of the eyeball of the user with respect to the display surface changes, and there is a possibility that the user cannot visually recognize the entire display image.

Therefore, the present disclosure proposes a novel and improved wearable display device that enables a user to recognize an entire display image even appropriately visually in a case where the superimposing position of the display image with respect to an image of the outside world is changed.

Solution to Problem

For solving the problem described above, a wearable display device according to one aspect of the present disclosure has a mounting unit configured to be mounted on a head of a user; an optical unit configured to emit light for forming a display image to eyeballs of the user; and a rotation mechanism configured to rotatably attach the optical unit to the mounting unit, wherein the rotation mechanism rotates the optical unit around a virtual axis passing through both of the eyeballs of the user.

BRIEF DESCRIPTION OF DRAWINGS

FIG. 5 a schematic diagram for describing a relationship between the optical unit and an eye-box, and the eyeball of the user.

FIG. 6 is a schematic diagram selectively illustrating a mounting unit and an image display device of the wearable display device according to a first embodiment of the present disclosure.

FIG. 7A is a schematic diagram illustrating movement when the image display device is rotated in the configuration example illustrated in FIG. 6.

FIG. 7B is a schematic diagram illustrating movement when the image display device is rotated in the configuration example illustrated in FIG. 6.

FIG. 12 is a schematic diagram selectively illustrating an optical unit and a rotation mechanism of a wearable display device according to a second embodiment.

DESCRIPTION OF EMBODIMENTS

Figure 1:
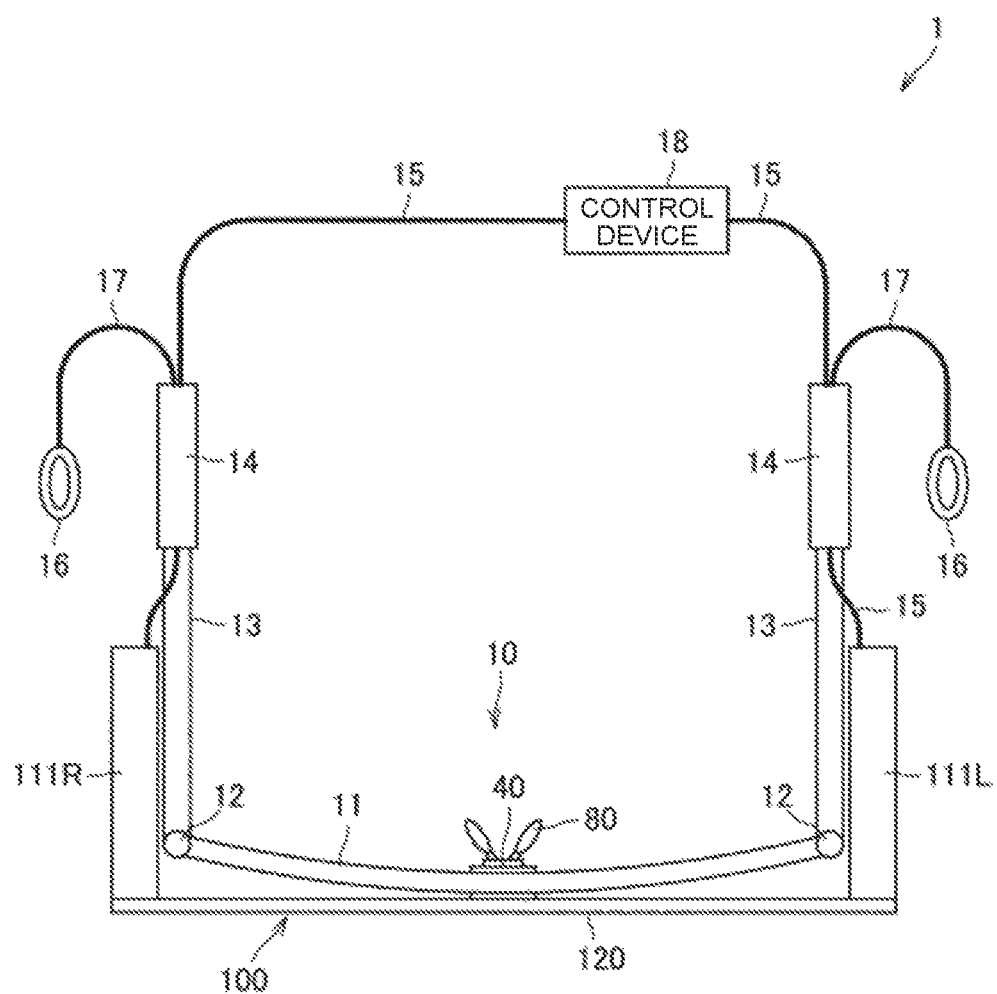
FIG. 1 a schematic diagram illustrating a wearable display device viewed from above.

Hereinafter, preferred embodiments of the present disclosure will be described in detail with reference to the appended drawings. Note that, in the present specification and the drawings, components having substantially the same functional configuration are provided with the same reference signs, so that an overlapping description of these components is omitted.

Note that in each drawing referred to in the following description, the sizes of some components may be exaggerated for convenience of description. Therefore, the relative sizes of the components illustrated in the drawings do not necessarily accurately express the magnitude relationship between the actual components.

Note that the description will be provided in the following order.

1. Wearable Display Device
1.1. Configuration of Device
1.2. Virtual Image Optical System
1.3. Eye-box
2. First Embodiment
2.1. Configuration Example
2.2. Specific Example
3. Second Embodiment
3.1. Configuration Example
3.2. Specific Example
4. Application Example

1. WEARABLE DISPLAY DEVICE

1.1. Configuration of Device

Figure 2:
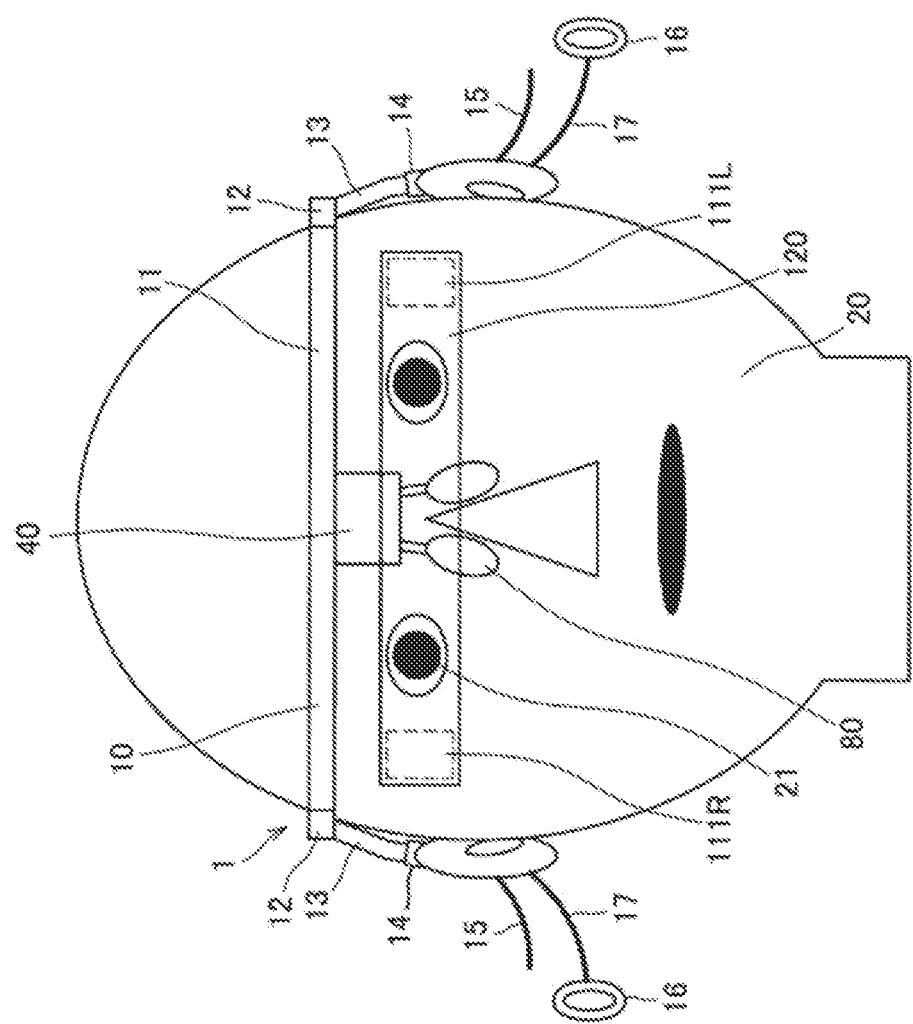
FIG. 2 is a schematic diagram illustrating a user wearing the wearable display device viewed from the front.
Figure 3:
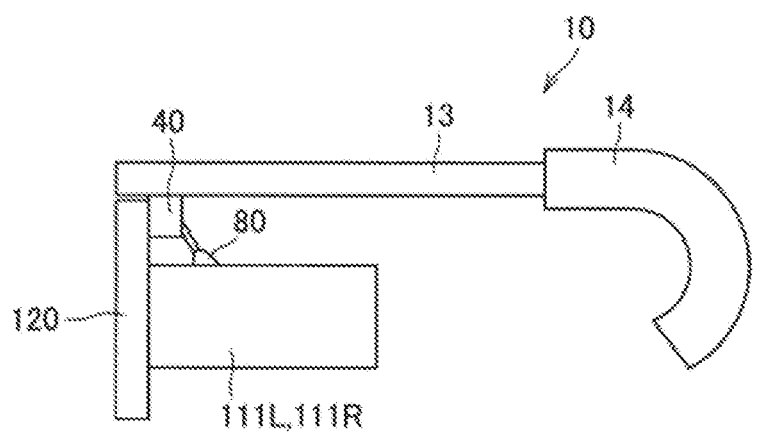
FIG. 3 is a schematic diagram illustrating the wearable display device viewed from a side.

First, a device configuration of a wearable display device to which the technology according to the present disclosure is applied will be described with reference to FIGS. 1 to 3. FIG. 1 is a schematic diagram illustrating the wearable display device viewed from above. FIG. 2 is a schematic diagram illustrating a user wearing the wearable display device viewed from the front. FIG. 3 is a schematic diagram illustrating the wearable display device viewed from a side.

As illustrated in FIGS. 1 to 3, a wearable display device 1 includes, for example, a mounting unit 10 that has a shape similar to that of an eyeglass frame and is to be attached to the head of a user 20, and an image display device 100 that is attached to the mounting unit 10 via an attachment member 40.

The image display device 100 includes a flat optical unit 120 disposed in a region facing each of right and left eyeballs 21 of user 20, and light generation units 111L and 111R (collectively referred to as a light generation unit 111 when not distinguished) that generate light to be emitted to the right and left eyeballs 21 of the user 20, respectively.

The light generation units 111L and 111R each generate light that is emitted to the eyeball 21 of the user 20 to form a display image as a virtual image. The light generated by each of the light generation units 111L and 111R is guided to a position facing the eyeball 21 of the user 20 by the optical unit 120, and then emitted to each of the right and left eyeballs 21 of the user 20.

Specifically, the light generated by the light generation unit 111L is guided to a position facing the left eyeball 21 of the user 20 by the optical unit 120, and is emitted to the left eyeball 21 of the user 20. On the other hand, the light generated by the light generation unit 111R is guided to a position facing the right eyeball 21 of the user 20 by the optical unit 120, and is emitted to the right eyeball 21 of the user 20. The light generation units 111L and 111R may generate monochromatic light for forming a monochromatic display image, or may generate light of at least three colors for forming a full-color display image.

The optical unit 120 includes, for example, a light guide plate and deflecting means, guides light generated by each of the light generation units 111L and 111R to a position facing the eyeball 21 of the user 20, and emits the light to each of the right and left eyeballs 21 of the user 20. The optical unit 120 may be formed as a semi-transparent (see-through) display surface which allows the user 20 to view an image of the outside world via the optical unit 120, or may be formed as a non-transparent display surface.

The mounting unit 10 includes a front portion 11 disposed in front of the head of the user 20, two temple portions 13 extending from opposite ends of the front portion 11 and provided so as to be rotatable with respect to the front portion 11 via hinges 12, and end cover portions 14 provided at one ends of the temple portion 13 that are opposite to the other ends of the temple portions 13 that are connected to the front portion 11. In addition, the attachment member 40 is provided on the front portion 11 between the right and left eyeballs 21 of the user 20, and a nose pad 80 that abuts on the nose of the user 20 is further provided on the attachment member 40.

The front portion 11, the nose pad 80, the hinge 12, the temple portion 13, and the end cover portion 14 may have substantially the same structure and be formed of substantially the same material as those of normal glasses. For example, each of the front portion 11, the nose pad 80, the hinge 12, the temple portion 13, and the end cover portion 14 may be formed of a metal, a synthetic resin, or the like.

In the wearable display device 1, a signal of an image to be displayed is input to the light generation units 111L and 111R by a wiring 15 connected to a control device 18 through the inside of the temple portions 13 and the inside of the end cover portions 14. The wiring 15 can include, for example, a signal line and a power supply line.

Further, in a case where the wearable display device 1 has a sound output function, the wearable display device 1 may include headphone wirings 17 and headphone units 16. The headphone wiring 17 extends from each of the end cover portions 14, and inputs an audio signal generated by the control device 18 to the headphone unit 16. The headphone unit 16 is provided at a distal tip of the headphone wiring 17 and reproduces an input sound signal as sound.

In FIGS. 1 to 3, the eyeglass-type display device is illustrated as the wearable display device 1 to which the technology according to the present disclosure is applied, but the wearable display device to which the technology according to the present disclosure is applied is not limited to such an example. The wearable display device 1 may be in any form as long as it is a display device that allows the user 20 to visually recognize a display image using a virtual image optical system. For example, the wearable display device 1 may be a head-mounted type wearable display device that covers the head, or may be a monocle-type monocular wearable display device.

1.2. Virtual Image Optical System

Figure 4:
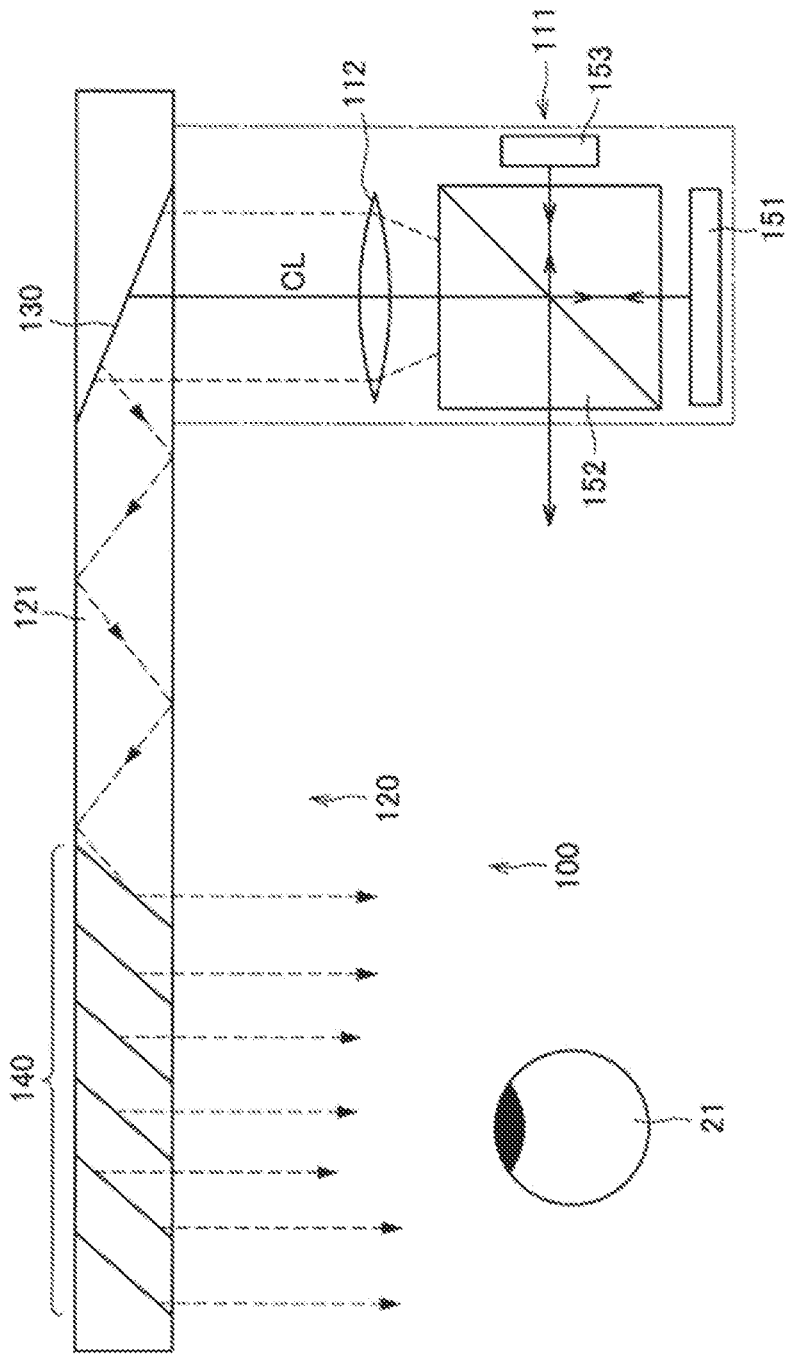
FIG. 4 is a schematic diagram for describing a virtual image optical system including an optical unit and a light generation unit.

Next, a virtual image optical system used in the wearable display device 1 will be described with reference to FIG. 4. FIG. 4 is a schematic diagram for describing a virtual image optical system including the optical unit 120 and the light generation unit 111.

As illustrated in FIG. 4, the light generation unit 111 includes a liquid crystal display device 151, a polarization beam splitter 152, a light source 153, and a collimating optical system 112.

The liquid crystal display device 151 is a display device in which a plurality of pixels are arranged in a two-dimensional matrix form, and functions as a light valve. The light source 153 is a light source that emits unpolarized light, such as a light emitting diode, and the polarization beam splitter 152 is an optical member through which polarized light that is a part of the incident light is transmitted and which reflects the remaining polarized light of the incident light.

Specifically, the unpolarized light emitted from the light source 153 first enters the polarization beam splitter 152. Here, a P-polarized component of the light emitted from the light source 153 passes through the polarization beam splitter 152 to be emitted to the outside of the system. On the other hand, a S-polarized component of the light emitted from the light source 153 is reflected by the polarization beam splitter 152 to be guided to the liquid crystal display device 151. The light incident on the liquid crystal display device 151 is emitted from the liquid crystal display device 151 by being reflected inside the liquid crystal display device 151. The light emitted from the liquid crystal display device 151 is incident on the polarization beam splitter 152 again. Here, among the light emitted from the liquid crystal display device 151, the light emitted from the pixels for displaying a white color contains a large amount of P-polarized components, and thus passes through the polarization beam splitter 152 and is emitted to the collimating optical system 112. On the other hand, the light emitted from the pixels for displaying a black color contains a large amount of S-polarized components, and is thus reflected by the polarization beam splitter 152 and returned to the light source 153.

The collimating optical system 112 converts light incident from the polarization beam splitter 152 into parallel light. The collimating optical system 112 can be implemented by a convex lens, a concave lens, a free-form surface prism, or a hologram lens alone or in combination. The light that has passed through the collimating optical system 112 and has been converted into parallel light enters the optical unit 120.

The optical unit 120 includes a first deflecting means 130, a light guide plate 121, and a second deflecting means 140. The light guide plate 121 is an optical member having two parallel surfaces extending in parallel with an axis of the light guide plate 121. The light guide plate 121 can be formed of, for example, a transparent member such as an optical glass such as quartz glass, an acrylic resin, a polycarbonate resin, or an amorphous polypropylene resin. The first deflecting means 130 is implemented by, for example, a single-layer light reflecting film to function as a reflecting mirror. The second deflecting means 140 is implemented by, for example, a multilayer light reflecting film having a laminated structure and functions as a semi-transparent mirror.

Therefore, the parallel light incident on the optical unit 120 from the collimating optical system 112 reflected by the first deflecting means 130 and then totally reflected between the two parallel surfaces of the light guide plate 121 to be guided. The light guided by the light guide plate 121 is reflected multiple times by the second deflecting means 140, and is emitted from the light guide plate 121 to the eyeball 21 of the user 20 in a parallel light state. Therefore, the virtual image optical system including the optical unit 120 and the light generation unit 111 allows the user 20 to visually recognize the image displayed on the liquid crystal display device 151 as a virtual image.

Furthermore, the optical unit 120 may be implemented by a lens such as a hologram lens. In a case where a lens such as a hologram lens is used as the optical unit 120, the optical unit 120 can emit light to the eyeball 21 of the user 20 by polarizing the light by the lens.

Note that the configuration illustrated in FIG. 4 is an example of implementing the virtual image optical system. The optical unit 120 and the light generation unit 111 may have any configuration as long as they can constitute the virtual image optical system.

1.3. Eye-Box

Next, an eye-box generated in the virtual image optical system will be described with reference to FIG. 5. FIG. 5 is a schematic diagram for describing a relationship between the optical unit 120 and an eye-box Eb, and the eyeball 21 of the user 20.

As illustrated in FIG. 5, the virtual image optical system, the eye-box Eb, which is a three-dimensional region in which the user 20 can visually recognize the entire virtual image of the display image, is formed according to a characteristic of the light emitted from the optical unit 120. In a case where the eyeball 21 is present in the range of the eye-box Eb, the user 20 can visually recognize the entire virtual image of the display image. However, in a case where the eyeball 21 deviates from the range of the eye-box Eb, the user 20 cannot visually recognize the display image at some angles of view.

In particular, since the eye-box Eb is formed in a substantially conical shape on the optical unit 120, in a case where the relative positions of the eyeball 21 of the user 20 and the optical unit 120 are changed, there is a possibility that the user 20 cannot visually recognize the display image at some angles of view.

For example, in the wearable display device in which the optical unit 120 is attached to the mounting unit 10 via the attachment member 40 having a rotatable hinge structure, in a case where the optical unit 120 is rotated with respect to the mounting unit 10 in order to change the position of the display image in a visual field of the user 20, the relative positions of the eye-box Eb and the eyeball 21 of the user 20 are changed.

Specifically, it is assumed that the eyeball 21 of the user 20 is in the eye-box Eb in a state where the optical unit 120 is attached to the mounting unit 10 at a substantially right angle. Here, in a case where the optical unit 120 is rotated toward the eyeball 21 with respect to the mounting unit 10 in order to move the position of the display image to the lower side of the visual field of the user 20, the eye-box Eb moves to the upper side of the eyeball 21 of the user 20. Further, in a case where the optical unit 120 is rotated away from the eyeball 21 with respect to the mounting unit 10 in order to move the position of the display image to the upper side of the visual field of the user 20, the eye-box Eb moves to the lower side of the eyeball 21 of the user 20.

Under such circumstances, there is a demand for a technology for controlling the positional relationship between the eyeball 21 and the optical unit 120 so that the eyeball 21 of the user 20 does not deviate from the eye-box Eb when changing the position of the display image in the visual field of the user 20.

Examples of a motive for changing the position of the display image in the visual field of the user 20 can include the following motives. For example, in a case where a subtitle displayed on the wearable display device is superimposed on a movie or the like broadcast in the outside world, the user may desire to select whether to superimpose the subtitle displayed on the wearable display device on the upper side or the lower side of the screen of the movie. Furthermore, in a case where navigation information of a route to a destination displayed on the wearable display device is superimposed on the landscape of the outside world, the user may desire to select whether to superimpose the navigation information displayed on the wearable display device on the road (lower side) or in the air (upper side).

The technology according to the present disclosure has been conceived in view of the above circumstances. In the technology according to the present disclosure, the mounting unit 10 and the optical unit 120 are rotated around a virtual axis passing through both the eyeballs 21 of the user 20. For example, the virtual axis may be an axis passing through the centers of both eyeballs 21 of user 20. Alternatively, the virtual axis may be an axis passing through both eyes of the user 20 determined when the wearable display device 1 is mounted on the head of the user 20. Therefore, the wearable display device 1 to which the technology according to the present disclosure is applied can suppress a change of the relative positions of the optical unit 120 and the eyeball 21 of the user 20 that occurs when the optical unit 120 is rotated. Therefore, the wearable display device 1 to which the technology according to the present disclosure is applied can suppress the deviation of the eyeball 21 of the user 20 from the eye-box Eb.

2. FIRST EMBODIMENT

2.1. Configuration Example

First, a configuration example of a first embodiment for implementing the technology according to the present disclosure will be described with reference to FIGS. 6 to 7B. FIG. 6 is a schematic diagram selectively illustrating a mounting unit 10 and an image display device 100 of a wearable display device 1 according to a first embodiment of the present disclosure. FIGS. 7A and 7B are schematic diagrams illustrating movements when the image display device 100 is rotated in the configuration example illustrated in FIG. 6.

As illustrated in FIG. 6, in the wearable display device 1 according to the first embodiment, an optical unit 120 is rotatably attached to an attachment member 40 and the mounting unit 10 via a rotation mechanism 41.

The rotation mechanism 41 is a mechanism that rotates the optical unit 120 around a virtual axis passing through both eyeballs 21 of the user 20. That is, the rotation mechanism 41 is not a rotation mechanism having a central axis of rotation inside the mechanism as exemplified by a hinge or the like, but is a rotation mechanism having a central axis of rotation outside the mechanism. Furthermore, when the wearable display device 1 is mounted on the user 20, the rotation mechanism 41 is supported by the attachment member 40 disposed in front of an intermediate position between the eyeballs 21 of the user 20. For example, the rotation mechanism 41 is provided on a central portion of the optical unit 120 between regions facing the right and left eyeballs 21 of the user 20, respectively. As a result, the rotation mechanism 41 can rotate the entire optical unit 120 with one mechanism.

In the first embodiment, the rotation mechanism 41 is a four-bar link including flat links having a width in a direction connecting the right and left eyeballs 21 of the user 20. Specifically, the rotation mechanism 41 has a structure in which two flat links functioning as a driving link and a driven link and facing each other connect a fixed link provided on the attachment member 40 and the optical unit 120 (functioning as an intermediate link). The two flat links facing each other are rotatably coupled to the fixed link of the attachment member 40 and the optical unit 120 by a mechanism such as a hinge. The rotation mechanism 41 implemented by the four-bar link and having a smaller and simpler structure can rotate the optical unit 120 around the virtual axis passing through both eyeballs 21 of the user 20.

For example, the rotation mechanism 41 may be configured so that a size in a direction (that is, a left-right direction of the head of the user 20) connecting the right and left eyeballs 21 of the user 20 is 20 mm or less, such that the rotation mechanism 41 does not interfere with the right and left fields of view of the user 20. Furthermore, the rotation mechanism 41 may be configured so that a size in an upward-downward direction with respect to the head of the user 20 is 20 mm or less so as to be within a range of the size of the optical unit 120. Furthermore, in order to secure a clearance between the head of the user 20 and the wearable display device 1, the rotation mechanism 41 may be configured so that a distance between the attachment member 40 and the optical unit 120 becomes smaller. For example, in a case of an optical design in which an eye relief of the wearable display device 1 is 20 mm, in order to secure a clearance of 10 mm between the head of the user 20 and the wearable display device 1, the rotation mechanism 41 may be configured so that the distance between the attachment member 40 and the optical unit 120 is 10 mm.

A range of an angle of rotation of the optical unit 120 by the rotation mechanism 41 can be appropriately set according to the specification of the wearable display device 1. For example, the range of the angle of rotation of the optical unit 120 by the rotation mechanism 41 may be 10 degrees in each of a top direction and a bottom direction with respect to the head of the user 20, that is, 20 degrees in total.

With the rotation mechanism 41 implemented by such a four-bar link, as illustrated in FIGS. 7A and 7B, the wearable display device 1 can rotate the optical unit 120 around the virtual axis penetrating the head of the user 20. With this configuration, since the wearable display device 1 can change the position and angle of the optical unit 120 in the upward-downward direction with respect to the head of the user 20 in an interlocking manner, it is possible to suppress a change of the relative positions of the eyeball 21 of the user 20 and the optical unit 120. Therefore, even in a case where the optical unit 120 is rotated to change the position of the display image in the visual field of the user 20, the wearable display device 1 can suppress the deviation of the eyeball 21 of the user 20 from the eye-box Eb.

Figure 8:
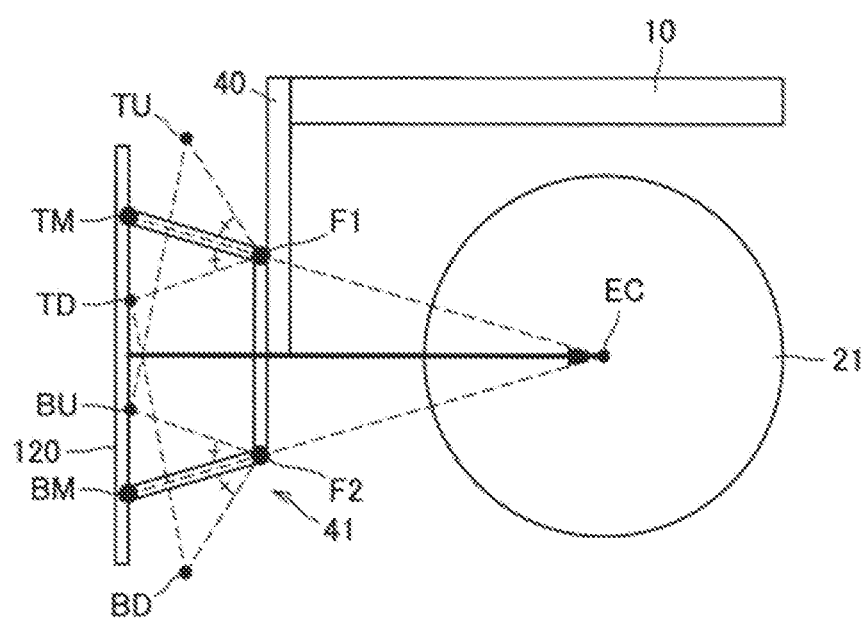
FIG. 8 is a schematic diagram for describing a method of setting a free end and a fixed end of a four-bar link implementing a rotation mechanism.
Figure 9A:
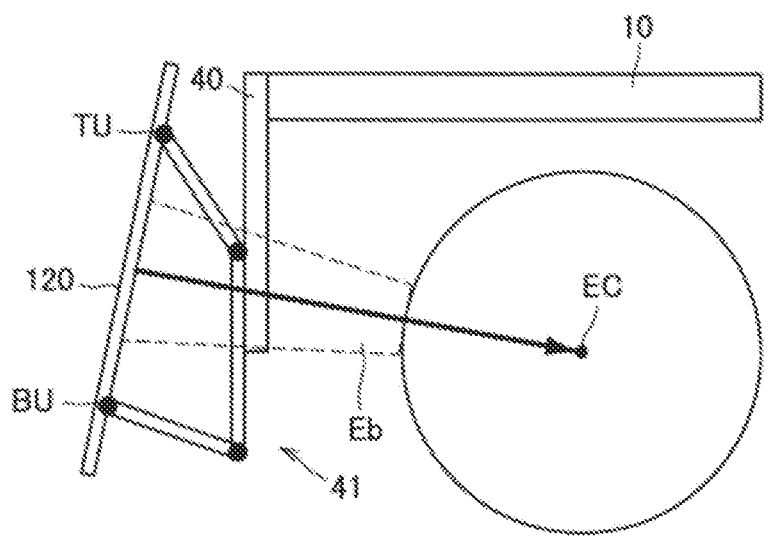
FIG. 9A is a schematic diagram for describing a state in which the rotation mechanism set by the method illustrated in FIG. 8 is rotated in an upward-downward direction.
Figure 9B:
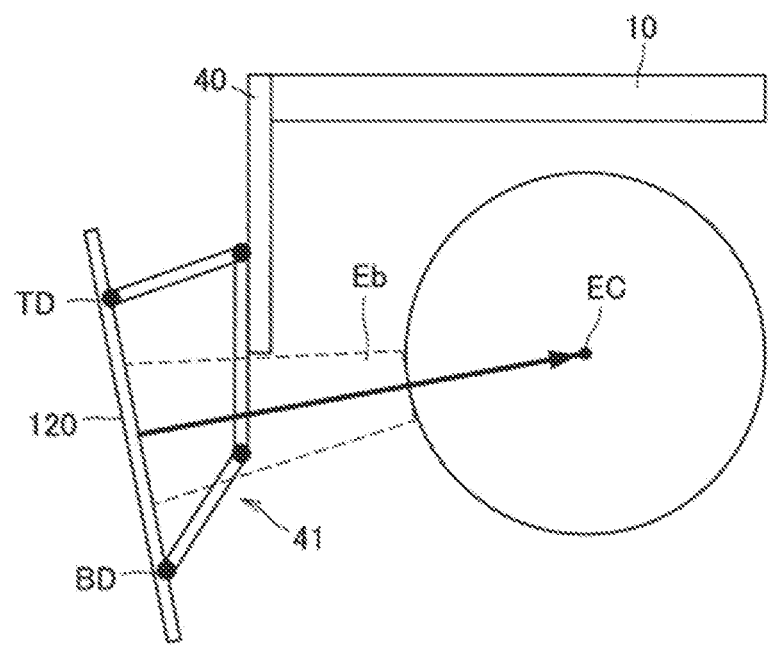
FIG. 9B is a schematic diagram for describing a state in which the rotation mechanism set by the method illustrated in FIG. 8 is rotated in the upward-downward direction.

Next, a method of setting the length of each link of the four-bar link implementing the rotation mechanism 41 will be described with reference to FIGS. 8 to 9B. In the first embodiment, by appropriately setting the length of each link of the four-bar link implementing the rotation mechanism 41, it is possible to rotate the optical unit 120 around an axis passing through a position closer to the centers of the right and left eyeballs of the user 20. FIG. 8 is a schematic diagram for describing a method of setting a free end and a fixed end of the four-bar link implementing the rotation mechanism 41. FIGS. 9A and 9B are each a schematic diagram for describing a state in which the rotation mechanism 41 set by the method illustrated in 8 is rotated in the upward-downward direction.

As illustrated in FIG. 8, in the four-bar link implementing the rotation mechanism 41, positions of end portions (also referred to as free ends) on the optical unit 120 side, which is the intermediate link, are defined as TM and BM, and positions of end portions (also referred to as fixed ends) of the fixed link on the attachment member 40 side are defined as F1 and F2.

Next, the range of the rotation angle of the optical unit 120 is set, and positions TU and BU of the free ends on the optical unit 120 corresponding to an upper limit of the range of the rotation angle and positions TD and BD of the free ends on the optical unit 120 side corresponding to a lower limit of the range of the rotation angle are set. At this time, the positions of the optical unit 120 corresponding to the upper limit and the lower limit of the range of the rotation angle are set so as to be rotated around the axis passing through the center EC of the eyeball 21 of the user 20 from the position of the optical unit 120 when the rotation angle is 0 degrees.

Here, the position F1 of one fixed end on the attachment member 40 side is set at an intersection between a perpendicular bisector of a segment connecting the upper limit position TU and the lower limit position TD of one free end on the optical unit 120 side and a straight line extending from the attachment member 40. Similarly, the position F2 of the other fixed end on the attachment member 40 side is set at an intersection between a perpendicular bisector of a segment connecting the upper limit position BU and the lower limit position BD of the other free end on the optical unit 120 side and a straight line extending from the attachment member 40.

Note that, in the example illustrated in FIG. 8, since the range of the rotation angle of the optical unit 120 is 10 degrees which is the same between the upward direction and the downward direction with respect to the head of the user 20, the structure of the four-bar link implementing the rotation mechanism 41 is symmetrical in the upward-downward direction. Specifically, the position TM of the free end and the position F1 of the fixed end, and the position BM of the free end and the position F2 of the fixed end are symmetrical to each other, and the lengths of the driving link and the driven link connecting the intermediate link and the fixed link are the same.

In a case where the range of the rotation angle of the optical unit 120 is asymmetric in the upward-downward direction with respect to the head of the user 20, the structure of the four-bar link implementing the rotation mechanism 41 can be asymmetric in the upward-downward direction. Even in such a case, the wearable display device 1 can appropriately set the length of each link of the four-bar link implementing the rotation mechanism 41 by using the setting method described above.

According to the above-described method, in the four-bar link in which the two free ends and the two fixed ends are set, as illustrated in FIGS. 9A and 9B, by driving the driving link and the driven link, the optical unit 120 functioning as the intermediate link is rotated around the center EC of the eyeball 21 of the user 20. In such a case, the eye-box Eb formed in the conical shape on the optical unit 120 is always formed so that a vertex thereof is directed toward the center EC of the eyeball 21 of the user 20. Therefore, the rotation mechanism 41 implemented by the four-bar link can prevent the deviation of the eyeball 21 of the user 20 from the eye-box Eb even when the optical unit 120 is rotated.

2.2. Specific Example

First Specific Example

Figure 10A:
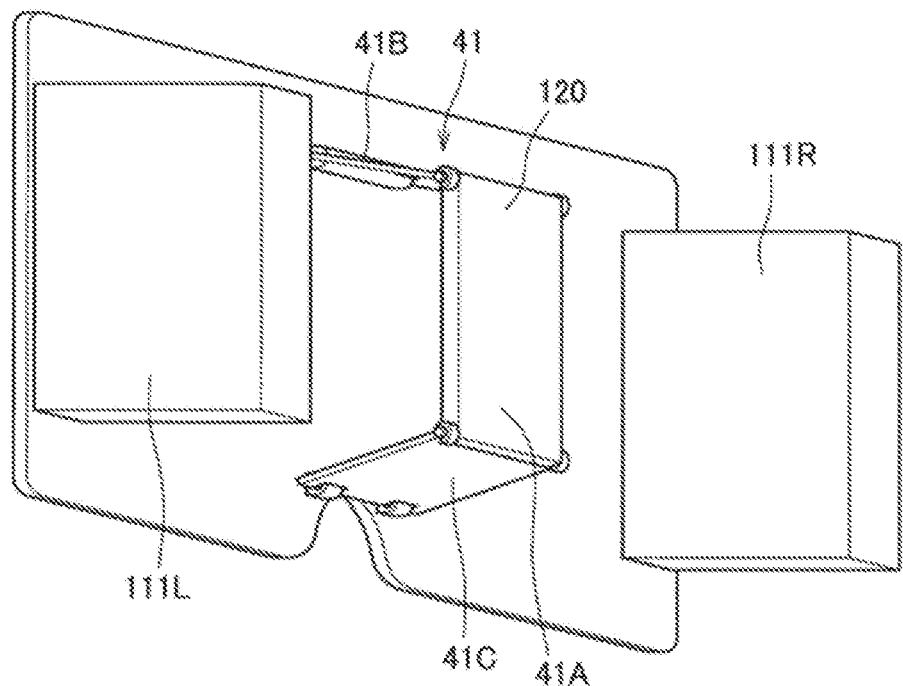
FIG. 10A is a schematic diagram illustrating a first specific example of the rotation mechanism.

Next, a first specific example of the rotation mechanism 41 will be described with reference to FIGS. 10A and 10B. FIG. 10A is a schematic diagram illustrating the first specific example of the rotation mechanism 41, and FIG. 10B is an enlarged schematic diagram illustrating a fixing mechanism included in the rotation mechanism 41 illustrated in FIG. 10A.

As illustrated in FIG. 10A, the four-bar link implementing the rotation mechanism 41 is constituted by a fixed link 41A attached to the attachment member 40, the optical unit 120 functioning as the intermediate link, and driving or driven links 41B and 41C rotatably connecting the optical unit 120 and the fixed link 41A. The fixed link 41A and the driving or driven links 41B and 41C are each provided in a flat plate shape.

Figure 10B:
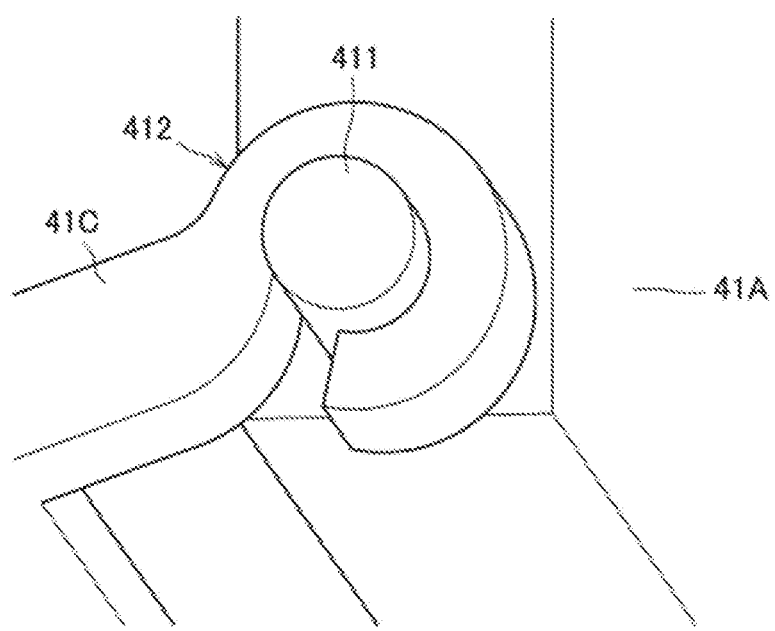
FIG. 10B is an enlarged schematic diagram illustrating a fixing mechanism included in the rotation mechanism illustrated in FIG. 10A.

Here, as illustrated in FIG. 10B, in the first specific example, the rotation mechanism 41 includes the fixing mechanism for fixing the rotation position of the optical unit 120 with respect to the attachment member 40. Specifically, in the rotation mechanism 41, at least one hinge rotatably coupling the respective links of the four-bar link to each other is configured as a torque hinge capable of generating a torque.

The torque hinge is a hinge formed by winding a leaf spring portion 412 around a shaft portion 411. Since the torque hinge can Generate a frictional resistance between the leaf spring portion 412 and the shaft portion 411 at the time of the rotation of the hinge, an operation load with respect to the rotation of the hinge can be generated. For example, in a case where the weight of the optical unit 120 is 100 g, by setting the operation load of the torque hinge to 3N, the rotation position of the optical unit 120 can be fixed so that the rotation position of the optical unit 120 is not changed due to the daily operation of the user 20.

According to the first specific example, in the rotation mechanism 41, the rotation position of the optical unit 120 with respect to the eyeball 21 of the user 20 can be fixed, such that the rotation position of the optical unit 120 is not changed due to the daily operation of the user 20. Therefore, the convenience of the wearable display device 1 for the user 20 can be improved.

Second Specific Example

Figure 11A:
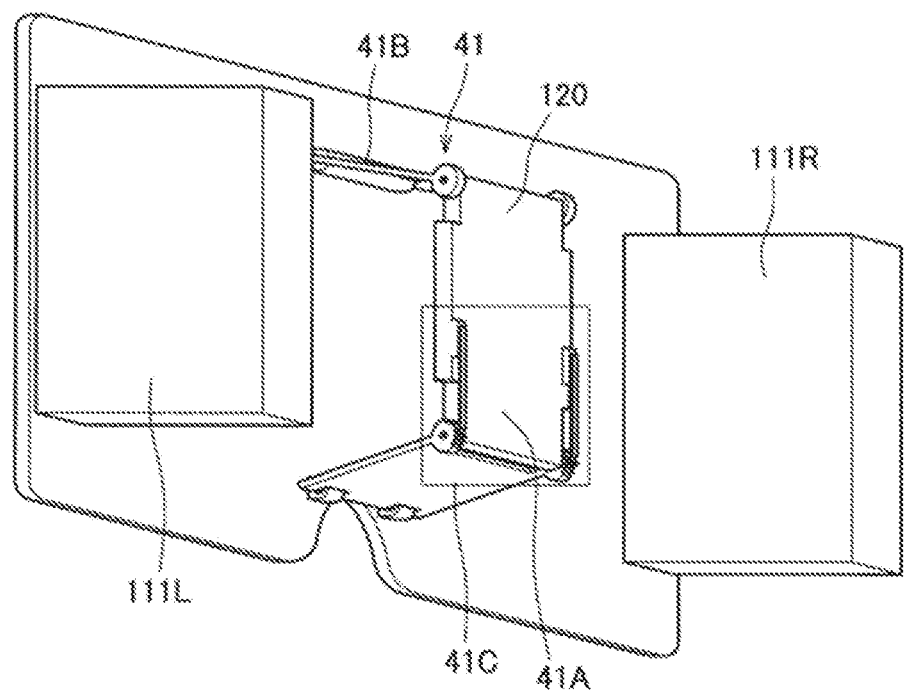
FIG. 11A is a schematic diagram illustrating a second specific example of the rotation mechanism.

Next, a second specific example of the rotation mechanism 41 will be described with reference to FIGS. 11A and 11B. FIG. 11A is a schematic diagram illustrating the second specific example of the rotation mechanism 41, and FIG. 11B is an enlarged schematic diagram illustrating a fixing mechanism included in the rotation mechanism 41 illustrated in FIG. 11A.

As illustrated in FIG. 11A, the four-bar link implementing the rotation mechanism 41 is constituted by a fixed link 41A attached to the attachment member 40, the optical unit 120 functioning as the intermediate link, and driving or driven links 41B and 41C rotatably connecting the optical unit 120 and the fixed link 41A. The fixed link 41A and the driving or driven links 41B and 41C are each provided in a flat plate shape.

Figure 11B:
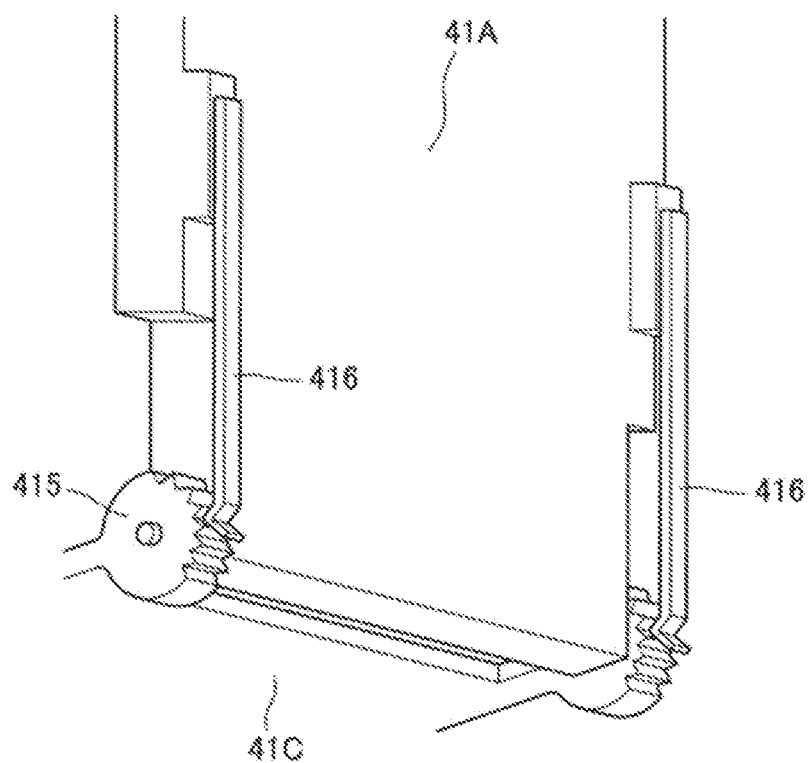
FIG. 11B is an enlarged schematic diagram illustrating a fixing mechanism included in the rotation mechanism illustrated in FIG. 11A.

Here, as illustrated in FIG. 11B, in the second specific example, the rotation mechanism 41 includes the fixing mechanism for fixing the rotation position of the optical unit 120 with respect to the attachment member 40. Specifically, in the rotation mechanism 41, at least one hinge rotatably coupling the respective links of the four-bar link to each other is configured in a click-position structure.

The click-position structure includes a recess structure portion 415 including a plurality of recesses formed continuously and a pressing portion 416 including one protrusion fitted to one of the plurality of recesses. Specifically, the recess structure portion 415 is provided around a rotation shaft of the driving or driven link 41C, and the pressing portion 416 is provided on the fixed link 41A so as to have the protrusion fitted to one of the recesses of the recess structure portion 415.

The pressing portion 416 can generate a frictional resistance between the driving or driven link 41C and the fixed link 41A due to fitting of the protrusion to the recess by pressing the protrusion against the recess of the recess structure portion 415 using an elastic force of a leaf spring or the like. The click-position structure can generate a torque serving as the operation load with respect to the rotation of the hinge. For example, in a case where the weight of the optical unit 120 is 100 g, by setting the operation load of the click-position structure to 3N, the rotation position of the optical unit 120 can be fixed so that the rotation position of the optical unit 120 is not changed due to the daily operation of the user 20.

Further, in the click-position structure, as the fixed link 41A and the driving or driven links 41B and 41C rotate, the protrusion of the pressing portion 416 is sequentially fitted to each of the plurality of recesses provided in the recess structure portion 415. As a result, the click-position structure can control the rotation positions of the fixed link 41A and the driving or driven link 41C in multiple stages. Therefore, the wearable display device 1 can control the rotation position of the optical unit 120 with respect to the mounting unit 10 in multiple stages.

According to the second specific example, in the rotation mechanism 41, the rotation position of the optical unit 120 with respect to the eyeball 21 of the user 20 is fixed so as not to be changed due to the daily operation of the user 20. Therefore, the convenience of the wearable display device 1 for the user 20 is improved.

3. SECOND EMBODIMENT

3.1. Configuration Example

Next, a configuration example of a second embodiment for implementing the technology according to the present disclosure will be described with reference to FIG. 12. FIG. 12 is a schematic diagram selectively illustrating an optical unit 120 and a rotation mechanism 42 of a wearable display device 1 according to a second embodiment.

As illustrated in FIG. 12, in the wearable display device 1 according to the second embodiment, the optical unit 120 is rotatably attached to an attachment member 40 and a mounting unit 10 (not illustrated) via the rotation mechanism 42.

In the second exemplary embodiment, the rotation mechanism 42 is an arc slide mechanism having a curved surface whose rotation center is an axis passing through substantially the centers of the right and left eyeballs 21 of the user 20. Specifically, the rotation mechanism 42 is a slide mechanism slidably provided on a back surface of the optical unit 120, and can rotate the optical unit 120 in the upward-downward direction along the curved surface whose rotation center is the axis passing through substantially the centers of the right and left eyeballs 21 of the user 20. Therefore, the rotation mechanism 42 implemented by the arc slide mechanism can rotate the optical unit 120 along an accurate curved surface having a virtual axis passing through both eyeballs 21 of the user 20 as the center.

For example, the rotation mechanism 42 may be configured so that a size in a direction (that is, a left-right direction of the head of the user 20) connecting the right and left eyeballs 21 of the user 20 is 20 mm or less, such that the rotation mechanism 42 does not interfere with the right and left fields of view of the user 20. Furthermore, the rotation mechanism 42 may be configured so that a size in an upward-downward direction with respect to the head of the user 20 is 20 mm or less so as to be within a range of the size of the optical unit 120. Furthermore, in order to secure a clearance between the head of the user 20 and the wearable display device 1, the rotation mechanism 42 may be configured so that a distance between the attachment member 40 and the optical unit 120 becomes smaller. For example, in a case of an optical design in which an eye relief of the wearable display device is 20 mm, in order to secure a clearance of 10 mm between the head of the user 20 and the wearable display device 1, the rotation mechanism 42 may be configured so that the distance between the attachment member 40 and the optical unit 120 is 10 mm.

A range of an angle of rotation of the optical unit 120 by the rotation mechanism 42 can be appropriately set according to the specification of the wearable display device 1. For example, the range of the angle of rotation of the optical unit 120 by the rotation mechanism 42 may be 10 degrees in each of a top direction and a bottom direction with respect to the head of the user 20, that is, 20 degrees in total.

With the rotation mechanism 42 implemented by such an arc slide mechanism, as illustrated in FIG. 12, the wearable display device 1 can accurately rotate the optical unit 120 along the curved surface whose rotation center is the axis passing through substantially the centers of the right and left eyeballs 21 of the user 20. With this configuration, the wearable display device 1 can rotate the optical unit 120 so that a normal direction of a display surface of the optical unit 120 is always directed to substantially the center of the eyeball 21 of the user 20. Therefore, even in a case where the optical unit 120 is rotated to change the position of the display image in the visual field of the user 20, the wearable display device 1 can prevent the deviation of the eyeball 21 of the user 20 from the eye-box Eb.

3.2. Specific Example

First Specific Example

Figure 13A:
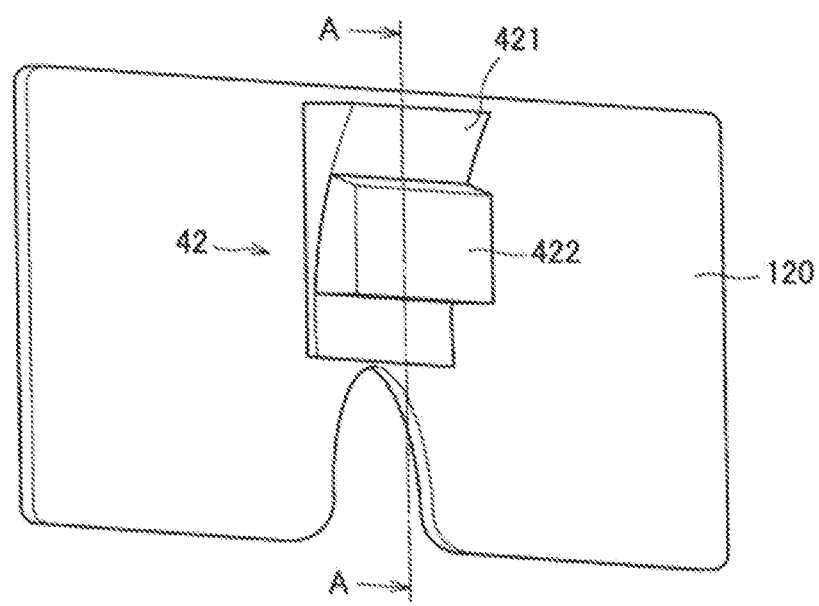
FIG. 13A is a schematic diagram illustrating a first specific example of the rotation mechanism.
Figure 13B:
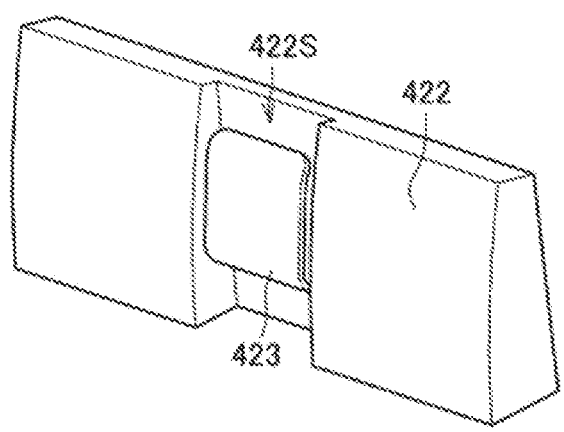
FIG. 13B is a schematic diagram of a side of a second slide portion of the rotation mechanism illustrated in FIG. 13A that faces a first slide portion.
Figure 13C:
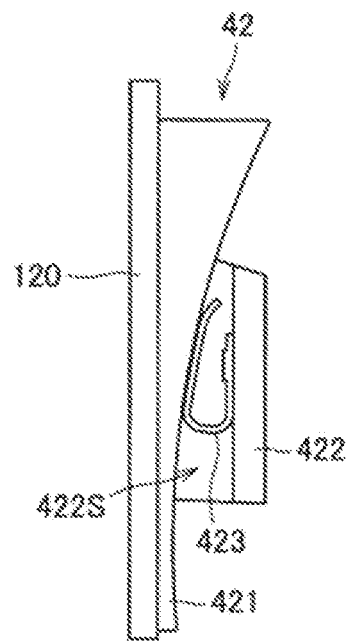
FIG. 13C is a schematic diagram illustrating a cross section of the rotation mechanism illustrated in FIG. 13A taken along line A-A.

Next, a first specific example of the rotation mechanism 42 will be described with reference to FIGS. 13A to 13C. FIG. 13A is a schematic diagram illustrating a first specific example of the rotation mechanism 42, and FIG. 13B is a schematic diagram of a side of a second slide portion 422 of the rotation mechanism 42 illustrated in FIG. 13A that faces a first slide portion 421. FIG. 13C is a schematic diagram illustrating a cross section of the rotation mechanism 42 illustrated in FIG. 13A taken along line A-A.

As illustrated in FIG. 13A, the arc slide mechanism implementing the rotation mechanism 42 includes the first slide portion 421 and the second slide portion 422. The first slide portion 421 has a curved surface whose rotation center is an axis passing through substantially the centers of the right and left eyeballs 21 of the user 20, and is provided on the optical unit 120. In addition, the second slide portion 422 is provided on the attachment member 40 so as to be slidable along the curved surface of the first slide portion 421.

Furthermore, in the first specific: example, the rotation mechanism 42 further includes a fixing mechanism for fixing the rotation position of the optical unit 120 with respect to the attachment member 40. Specifically, as illustrated in FIGS. 13B and 13C, a leaf spring 423 that generates a sliding resistance by being pressed against the first slide portion 421 is provided inside an opening 422S provided in a surface of the second slide portion 422 that faces the first slide portion 421. Therefore, the leaf spring 423 can generate an operation load with respect to the rotation of the rotation mechanism 42 by the sliding resistance. For example, in a case where the weight of the optical unit 120 is 100 g, by setting the operation load of the sliding resistance of the leaf spring 423 to 3N, the rotation position of the optical unit 120 can be fixed so as not to be changed due to the daily operation of the user 20.

Note that, in the first specific example, instead of the leaf spring 423, another elastic member such as rubber may be used to generate a sliding resistance between the first slide portion 421 and the second slide portion 422.

According to the first specific example, in the rotation mechanism 42, the rotation position of the optical unit 120 with respect to the eyeball 21 of the user 20 can be fixed, such that the rotation position of the optical unit 120 is not changed due to the daily operation of the user 20. Therefore, the convenience of the wearable display device 1 for the user 20 can be improved.

Second Specific Example

Figure 14A:
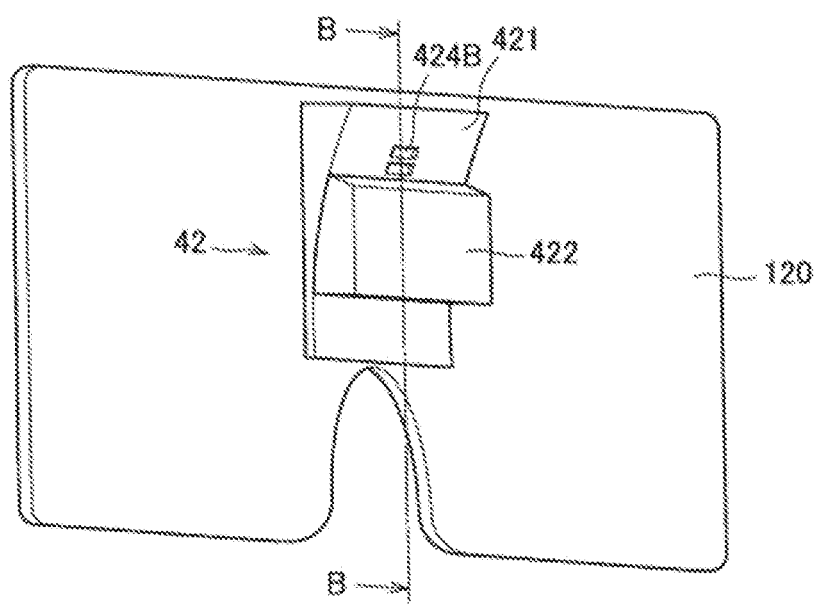
FIG. 14A is a schematic diagram illustrating a second specific example of the rotation mechanism.
Figure 14B:
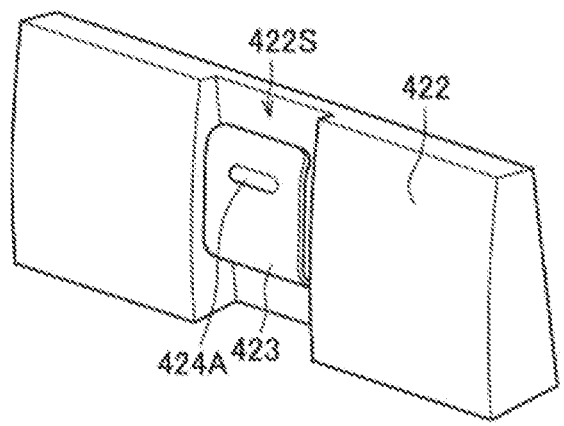
FIG. 14B is a schematic diagram of a side of a second slide portion of the rotation mechanism illustrated in 14A that faces a first slide portion.
Figure 14C:
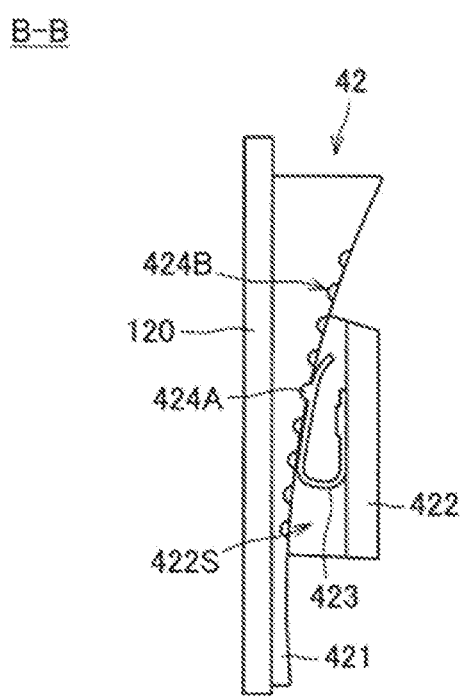
FIG. 14C is a schematic diagram illustrating a cross section of the rotation mechanism illustrated in FIG. 14A taken along line B-B.

Next, a second specific example of the rotation mechanism 42 will be described with reference to FIGS. 14A to 14C. FIG. 14A is a schematic diagram illustrating a second specific example of the rotation mechanism 42, and FIG. 14B is a schematic diagram of a side of a second slide portion 422 of the rotation mechanism 42 illustrated in FIG. 14A that faces a first slide portion 421. FIG. 14C is a schematic diagram illustrating a cross section of the rotation mechanism 42 illustrated in FIG. 14A taken along line B-B.

As illustrated in FIG. 14A, the arc slide mechanism implementing the rotation mechanism 42 includes the first slide portion 421 and the second slide portion 422. The first slide portion 421 has a curved surface whose rotation center is an axis passing through substantially the centers of the right and left eyeballs 21 of the user 20, and is provided on the optical unit 120. In addition, the second slide portion 422 is provided on the attachment member 40 so as to be slidable along the curved surface of the first slide portion 421.

Furthermore, in the second specific example, the rotation mechanism 42 further includes a fixing mechanism for fixing the rotation position of the optical unit 120 with respect to the attachment member 40. Specifically, as illustrated in FIGS. 14B and 14C, a leaf spring 423 configured to be pressed against the first slide portion 421 is provided inside an opening 422S provided in a surface of the second slide portion 422 that faces the first slide portion 421. Further, the leaf spring 423 is provided with a protrusion 424A that is fitted to one of a plurality of recesses 424B provided in the first slide portion 421. That is, in the second specific example, a click-position structure is formed between the second slide portion 422 and the first slide portion 421.

The plurality of recesses 424B provided in the first slide portion 421 are arranged at predetermined intervals along a sliding direction of the second slide portion 422 with respect to the first slide portion 421. The protrusion 424A provided on the leaf spring 423 is sequentially fitted to each of the plurality of recesses 424B of the first slide portion 421 as the second slide portion 422 moves, such that the relative positions of the first slide portion 421 and the second slide portion 422 can be controlled in multiple stages. With this configuration, the wearable display device 1 can control the rotation position of the optical unit 120 with respect to the mounting unit 10 in multiple stages.

According to the second specific example, in the rotation mechanism 42, the rotation position of the optical unit 120 with respect to the eyeball 21 of the user 20 can be fixed, such that the rotation position of the optical unit 120 is not changed due to the daily operation of the user 20. Therefore, the convenience of the wearable display device 1 for the user 20 can be improved.

4. APPLICATION EXAMPLE

Figure 15:
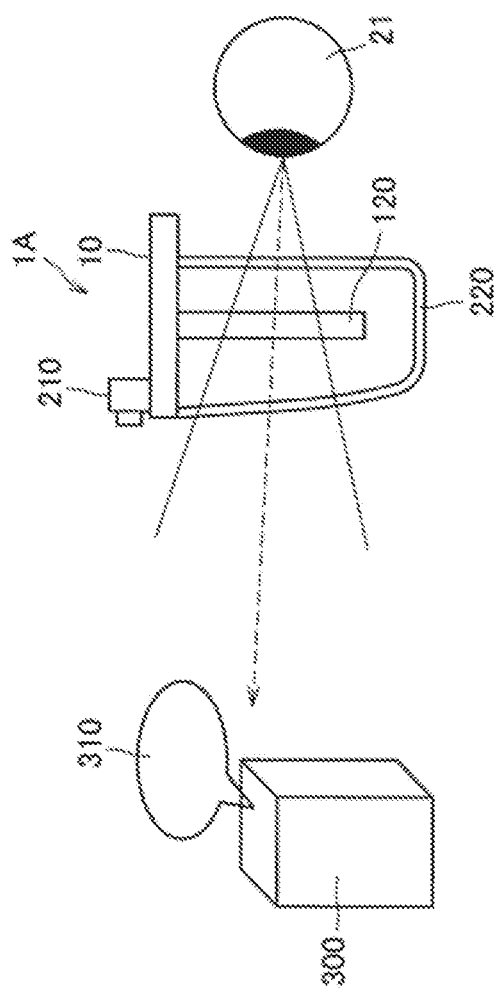
FIG. 15 is an explanatory diagram illustrating an example of a case where a technology according to the present disclosure is applied to a wearable display device that displays a virtual object at a position corresponding to an actual object.

Further, an application example of the technology according to the present disclosure will be described with reference to FIG. 15, FIG. 15 is an explanatory diagram illustrating an example of a case where the technology according to the present disclosure is applied to a wearable display device 1A that displays a virtual object at a position corresponding to an actual object.

As illustrated in FIG. 15, it is assumed that a virtual object 310 corresponding to an actual object 300 is superimposed and displayed on the actual object 300 present in a real space via the wearable display device 1A.

In such a case, the display position of the virtual object 310 is controlled based on the position of the actual object 300 in a visual field of the wearable display device 1A. Specifically, the display position of the virtual object 310 is controlled based on a relative positional relationship between the actual object 300 detected by a sensor 210 provided in the wearable display device 1A and the wearable display device 1A. Therefore, in a case where the virtual object 310 corresponding to the actual object 300 is superimposed and displayed, the user 20 is unlikely to have a motive for changing the display position of the display image with respect to the visual field of the outside world.

On the other hand, in the full-face type wearable display device 1A including a mounting unit 10 and a visor 220 as illustrated in FIG. 15, a direction in which the wearable display device 1A is mounted may be changed depending on a head shape of each user 20. In such a case, there is a possibility that the upper side of the visual field of the user 20 is blocked by the mounting unit 10 when the direction in which the wearable display device 1A is mounted is a downward direction, or the lower side of the visual field of the user 20 is blocked by a bottom surface of the visor 220 when the direction in which the wearable display device 1A is mounted is an upward direction.

With the technology according to the present disclosure, even in the full-face type wearable display device 1A, it is possible to change the direction of the optical unit 120 while maintaining the relative positional relationship between the eye-box Eb formed by the optical unit 120 and the eyeball 21 of the user 20. Therefore, the full-face type wearable display device 1A can provide an appropriate transparent visual field (also referred to as a see-through visual field) for each user 20. Therefore, the technology according to the present disclosure can also be applied to appropriate adjustment of the direction in which the full-face type wearable display device 1A is mounted for each user 20.

As described above, the preferred embodiments of the present disclosure have been described in detail with reference to the accompanying drawings, but the technical scope of the present disclosure is not limited to such examples. It will be apparent to those skilled in the art to which the present disclosure pertains that various modifications or alterations can be conceived within the scope of the technical idea described in the claims and it is naturally understood that these modifications or alterations fall within the technical scope of the present disclosure.

Furthermore, the effects described in the present specification are merely illustrative or exemplary and are not restrictive. That is, the technology according to the present disclosure can exhibit, in addition to or in place of the above-described effects, other effects obvious to those skilled in the art from the description of the present specification.

Note that the following configurations also fall within the technical scope of the present disclosure.

(1) A wearable display device comprising:
mounting unit configured to be mounted on a head of a user;
an optical unit configured to emit light for forming a display image to eyeballs of the user; and
a rotation mechanism configured to rotatably attach the optical unit to the mounting unit,
wherein the rotation mechanism rotates the optical unit around a virtual axis passing through both of the eyeballs of the user.

(2) The wearable display device according to the above (1), wherein the optical unit emits the light for forming the display image to each of the right and left eyeballs of the user.

(3) The wearable display device according to the above (2), wherein the rotation mechanism is provided between regions of the optical unit that correspond to the right and left eyeballs of the user, respectively.

(4) The wearable display device according to any one of the above (1) to (3), wherein the rotation mechanism rotates the optical unit in an upward-downward direction with respect to the head of the user.

(5) The wearable display device according to any one of the above (1) to (4), wherein the rotation mechanism further includes a fixing mechanism that fixes a rotation position of the optical unit with respect to the mounting unit.

(6) The wearable display device according to any one of the above (1) to (5), further comprising
a light generation unit configured to generate the light for forming the display image,
wherein the optical unit includes a light guide plate that guides the light for forming the display image from the light generation unit to a position at which the light is to be emitted to the eyeball.

(7) The wearable display device according to any one of the above (1) to (6), wherein the rotation mechanism is a four-bar link in which a fixed link is attached to the mounting unit and an intermediate link is attached to the optical unit.

(8) The wearable display device according to the above (7), wherein one end or the other end of the fixed link is connected to one end or the other end of the intermediate link by a driving link or a driven link.

(9) The wearable display device according to the above (8), wherein the driving link has the same length as the driven link.

(10) The wearable display device according to any one of the above (7) to (9), wherein one end of the fixed link is provided on a perpendicular bisector of a segment connecting an upper limit position and a lower limit position of one end of the intermediate link connected to one end of the fixed link.

(11) The wearable display device according to any one of the above (1) to (6), wherein the rotation mechanism is a mechanism including sliders that slide on each other along an arc shape.

REFERENCE SIGNS LIST 1, 1A WEARABLE DISPLAY DEVICE
10 MOUNTING UNIT
11 FRONT PORTION
12 HINGE
13 TEMPLE PORTION
14 END COVER PORTION
15 WIRING
16 HEADPHONE UNIT
17 HEADPHONE WIRING
18 CONTROL DEVICE
20 USER
21 EYEBALL
40 ATTACHMENT MEMBER
41, 42 ROTATION MECHANISM
80 NOSE RAD
100 IMAGE DISPLAY DEVICE
111, 111L, 111R LIGHT GENERATION UNIT
112 COLLIMATING OPTICAL SYSTEM
120 OPTICAL UNIT
121 LIGHT GUIDE PLATE
130 FIRST DEFLECTING MEANS
140 SECOND DEFLECTING MEANS
151 LIQUID CRYSTAL DISPLAY DEVICE
152 POLARIZATION BEAM SPLITTER
153 LIGHT SOURCE

The invention claimed is:
1. A wearable display device comprising:
a mounting unit configured to be mounted on a head of a user;
an optical unit configured to emit light for forming a display image to eyeballs of the user; and
a rotation mechanism configured to rotatably attach the optical unit to the mounting unit at a position of the mounting unit corresponding to an intermediate position between the eyeballs of the user,
wherein the rotation mechanism rotates the optical unit around a virtual axis passing through both of the eyeballs of the user, and
wherein the rotation mechanism is a mechanism including sliders that each have an arc shape and slide on each other along the arc shape.

2. The wearable display device according to claim 1, wherein the optical unit emits the light for forming the display image to each of right and left eyeballs of the user.

3. The wearable display device according to claim 2, wherein the rotation mechanism is provided between regions of the optical unit that correspond to the right and left eyeballs of the user, respectively.

4. The wearable display device according to claim 1, wherein the rotation mechanism rotates the optical unit in an upward-downward direction with respect to the head of the user.

5. The wearable display device according to claim 1, wherein the rotation mechanism further includes a fixing mechanism that fixes a rotation position of the optical unit with respect to the mounting unit.

6. The wearable display device according to claim 1, further comprising
a light generation unit configured to generate the light for forming the display image,
wherein the optical unit includes a light guide plate that guides the light for forming the display image from the light generation unit to a position at which the light is to be emitted to the eyeballs of the user.

7. A wearable display device comprising:
a mounting unit configured to be mounted on a head of a user;
an optical unit configured to emit light for forming a display image to eyeballs of the user; and
a rotation mechanism configured to rotatably attach the optical unit to the mounting unit,
wherein the rotation mechanism rotates the optical unit around a virtual axis passing through both of the eyeballs of the user, and
wherein the rotation mechanism is a four-bar link in which a fixed link is attached to the mounting unit and an intermediate link is attached to the optical unit.

8. The wearable display device according to claim 7, wherein one end or an other end of the fixed link is connected to one end or the other end of the intermediate link by a driving link or a driven link.

9. The wearable display device according to claim 8, wherein the driving link has a same length as the driven link.

10. The wearable display device according to claim 7, wherein one end of the fixed link is provided on a perpendicular bisector of a segment connecting an upper limit position and a lower limit position of one end of the intermediate link connected to one end of the fixed link.

11. The wearable display device according to claim 1, wherein the sliders include a first slider having a curved surface having the arc shape and a second slider configured to slide along the curved surface along the arc shape.

\* \* \* \* \*